United States Patent [19]

Ergas et al.

[11] Patent Number: 4,543,632
[45] Date of Patent: Sep. 24, 1985

[54] ROBUST ESTIMATION METHOD FOR DETERMINING WHEN SUBSEQUENT DATA PROCESSING CAN INCLUDE SIGN-BIT REPRESENTATIONS OF FULL-WAVEFORM SEISMIC TRACES

[75] Inventors: Raymond A. Ergas, Laguna Beach; Francis Muir, Laguna Niguel, both of Calif.

[73] Assignee: Chevron Research Company, San Francisco, Calif.

[21] Appl. No.: 457,082

[22] Filed: Jan. 10, 1983

[51] Int. Cl.$^4$ .......................... G01V 1/30; G01V 1/36
[52] U.S. Cl. ..................................... 364/421; 367/20; 367/21; 367/39; 367/100
[58] Field of Search ................... 364/421; 367/20, 21, 367/63, 100, 39

[56] References Cited

U.S. PATENT DOCUMENTS

| | | | |
|---|---|---|---|
| 4,001,768 | 1/1977 | Fort et al. | 367/63 X |
| 4,346,461 | 8/1982 | Muir | 364/421 X |
| 4,479,183 | 10/1984 | Ergas | 364/421 |

Primary Examiner—Jerry Smith
Assistant Examiner—Clark A. Jablon
Attorney, Agent, or Firm—H. D. Messner; Edward J. Keeling

[57] ABSTRACT

A method is disclosed for determining if sign-clipped variations of full-waveform traces can be used in subsequent cross-correlation processing without undue hardship. In accordance with one aspect, the present invention examines skewness of the amplitude spectrum of the full waveform. If the former significantly differs from conventional Gaussian distribution over the frequency range of interest, i.e., the amplitude spectrum is non-Gaussian, sign-clipped versions thereof can be used in subsequent cross-correlation processing without undue loss in processing accuracy. In another aspect, the present invention is used to edit a series of traces, one at a time, gathered by a large multichannel collection system. In this aspect, the different spectral noise estimates, including cross-correlation estimates generated from sign-clipped versions of the full-waveform traces, are advantageously used.

11 Claims, 10 Drawing Figures

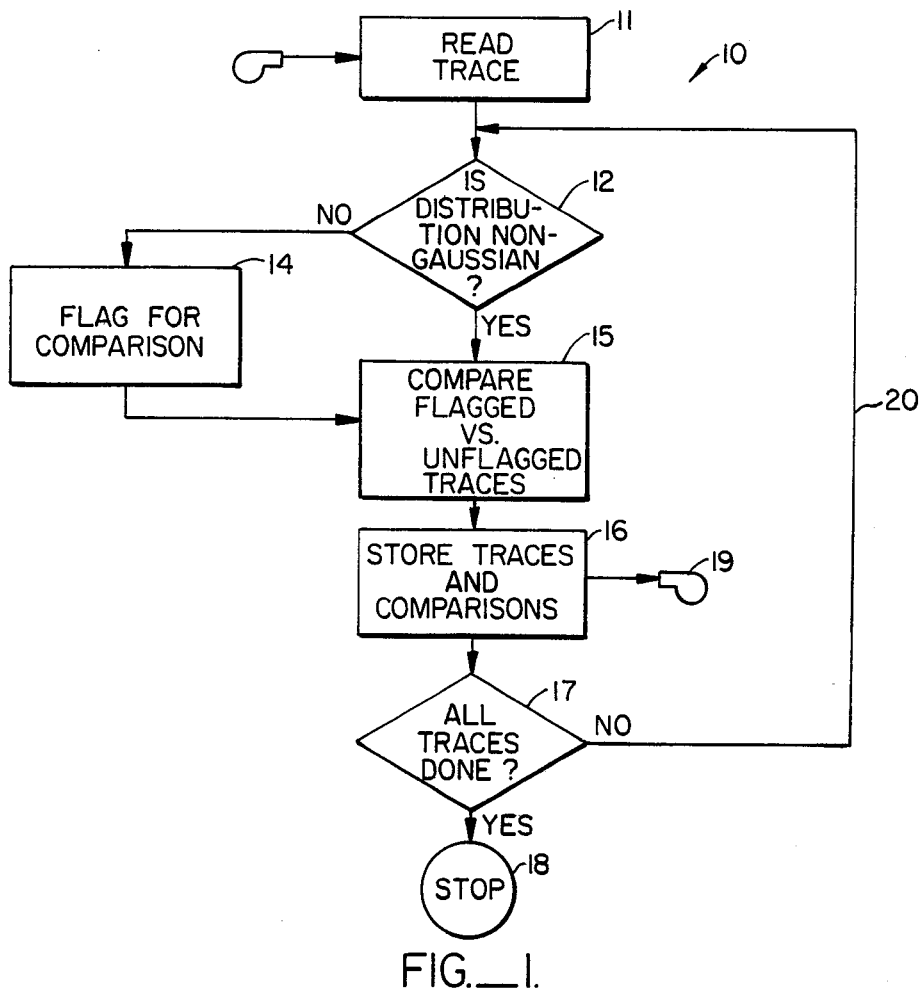
FIG._1.
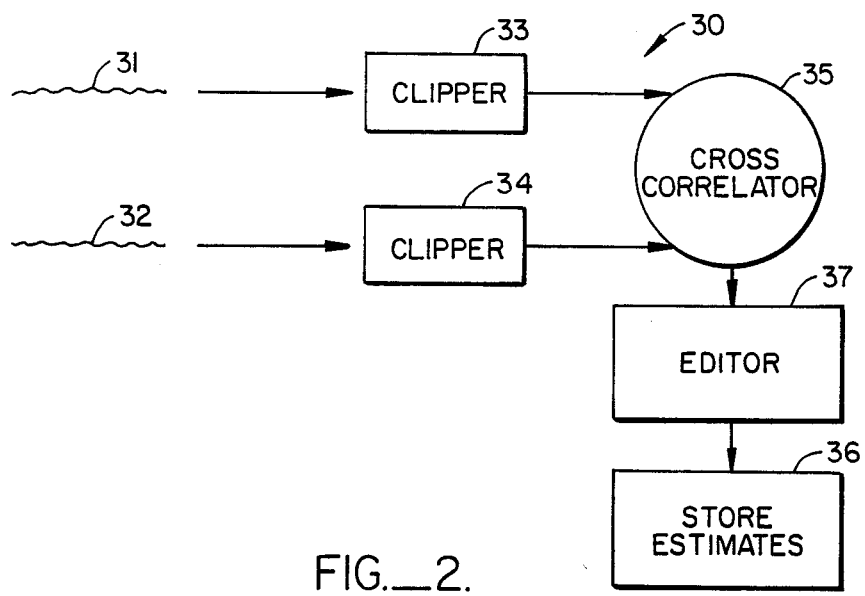
FIG._2.

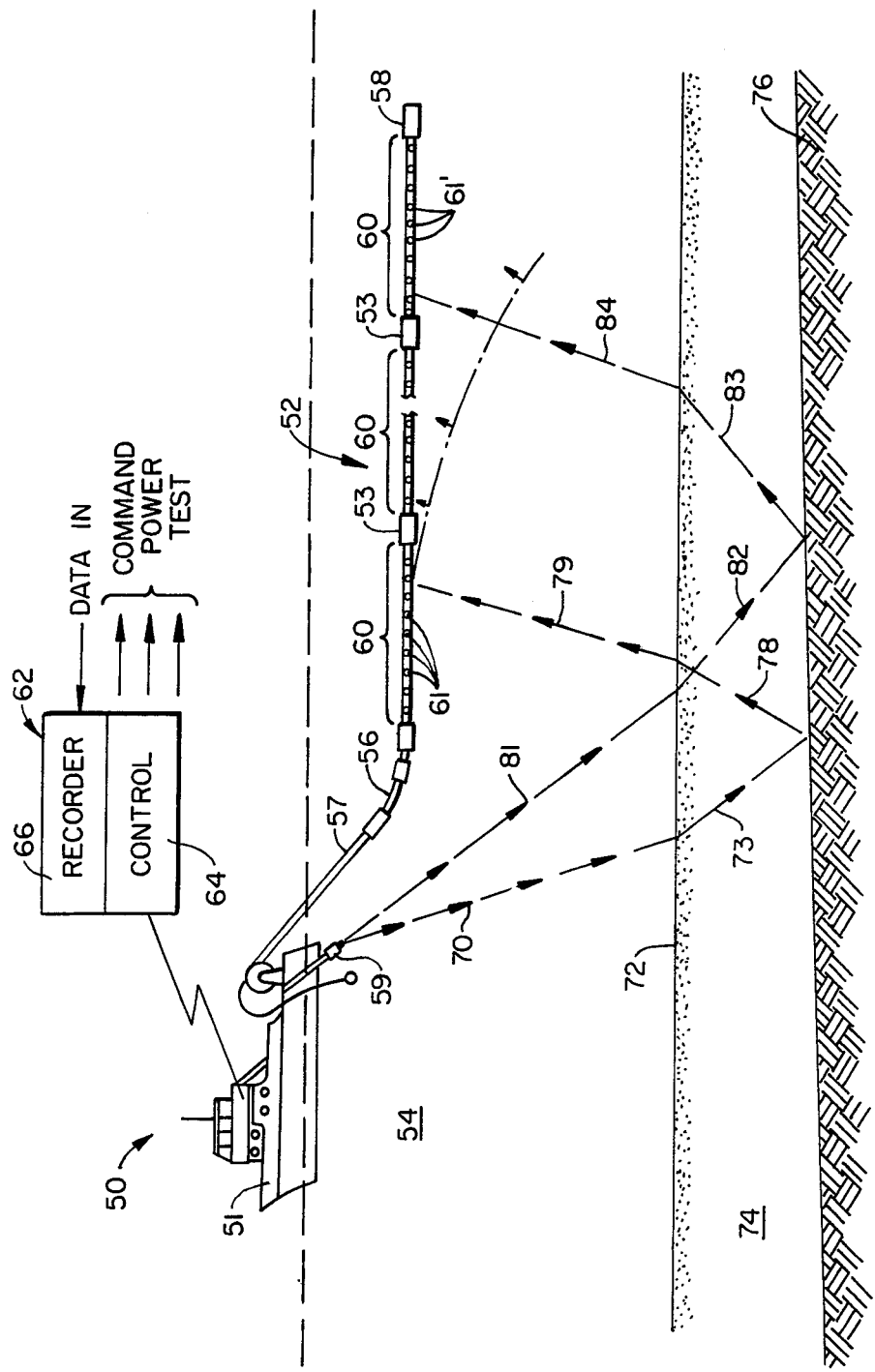
FIG._3.

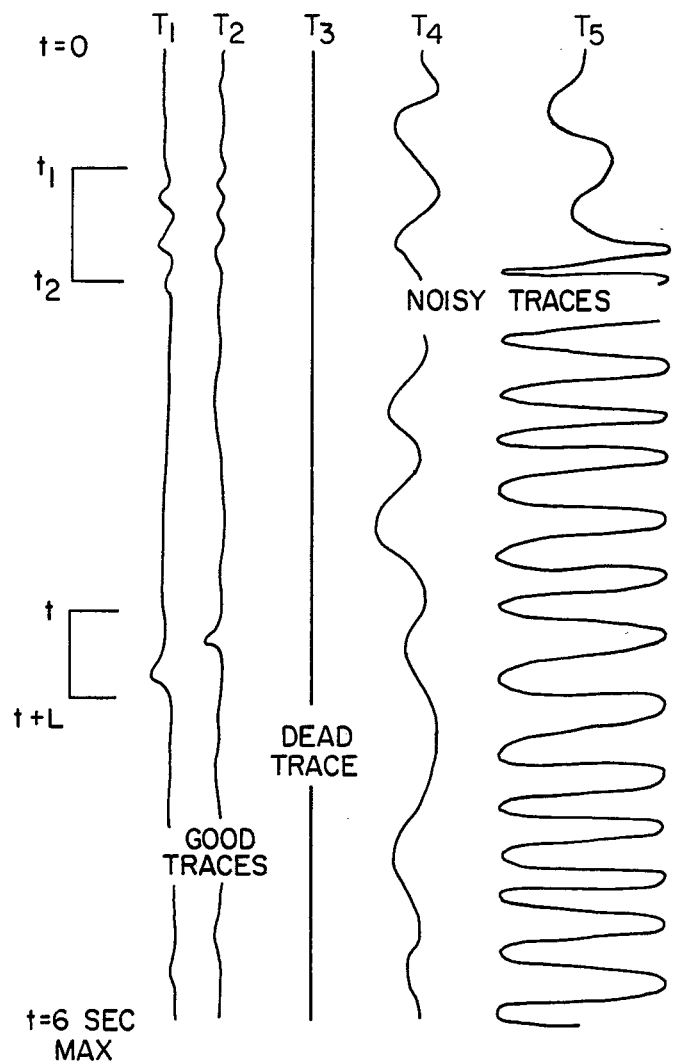
FIG._4.

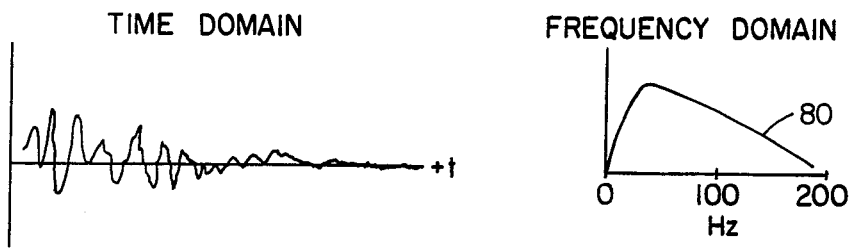
FIG._5A.
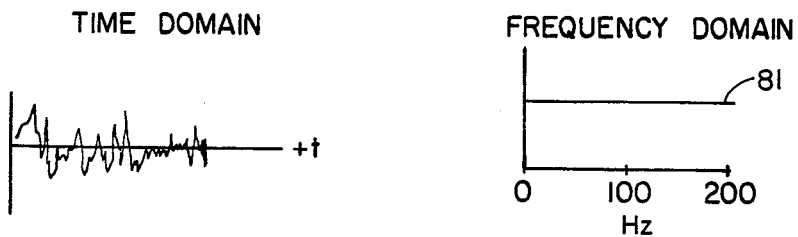
FIG._5B.
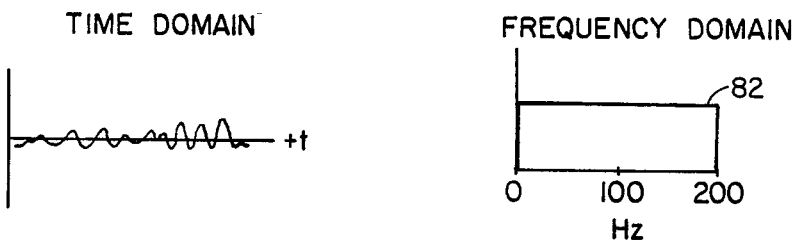
FIG._5C.

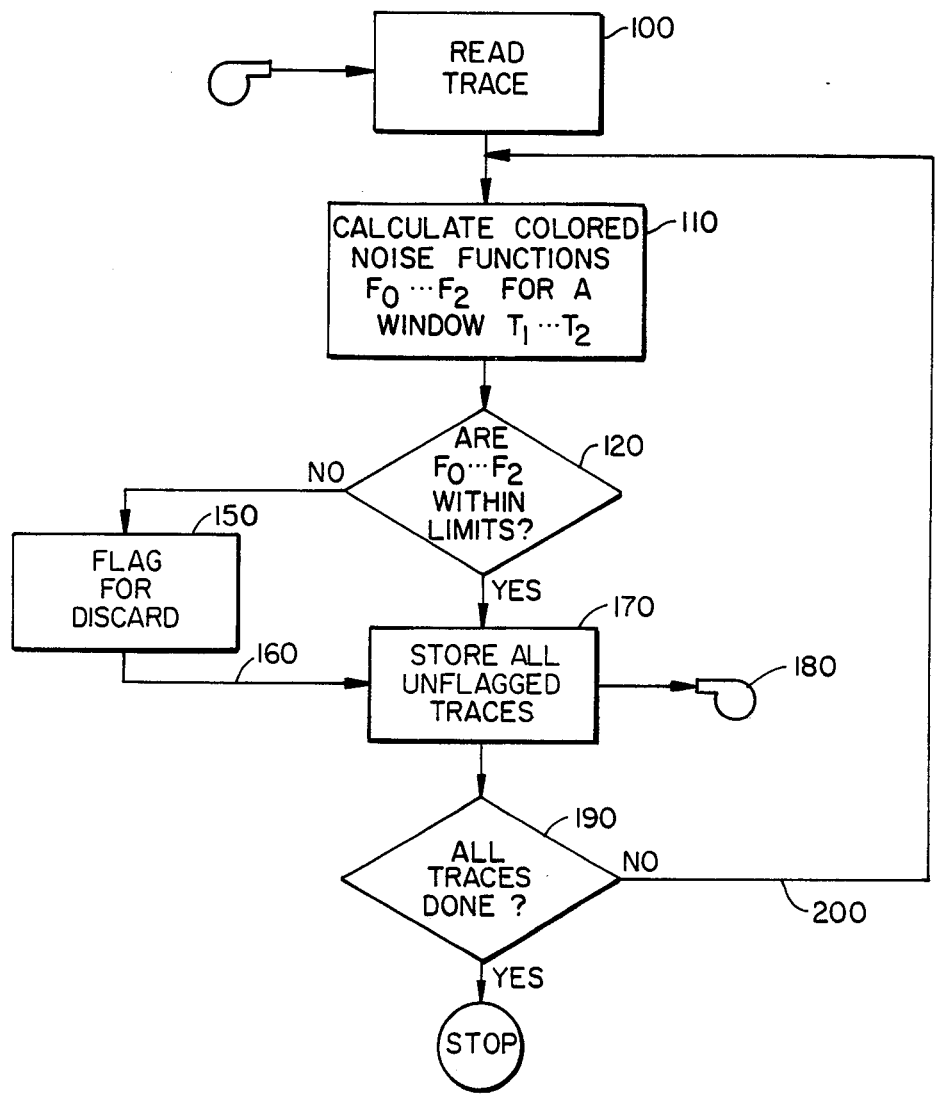
FIG._6.

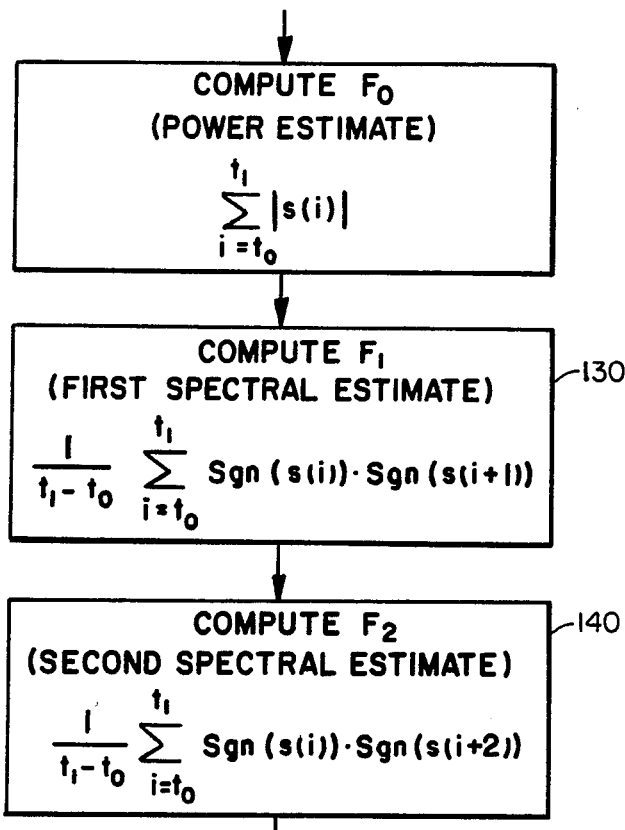
FIG _ 7
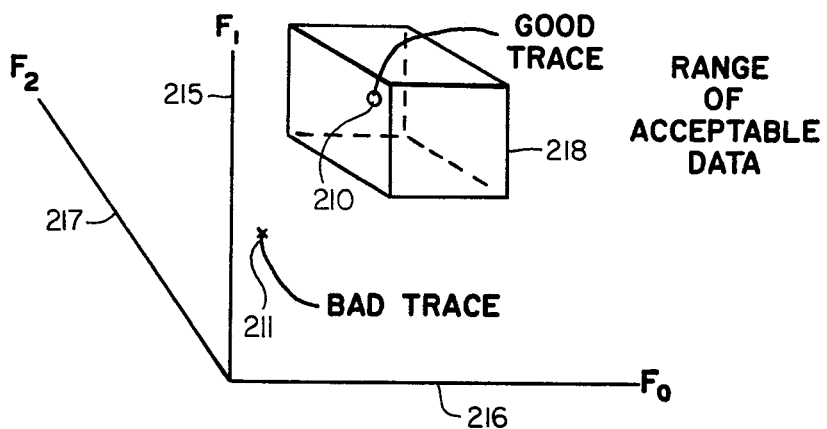
FIG _ 8

ROBUST ESTIMATION METHOD FOR DETERMINING WHEN SUBSEQUENT DATA PROCESSING CAN INCLUDE SIGN-BIT REPRESENTATIONS OF FULL-WAVEFORM SEISMIC TRACES

SCOPE OF THE INVENTION

This invention relates to a method of determining if sign-bit representations of full-waveform seismic data can be used in subsequent processing of the data, say in editing traces collected by large multichannel seismic systems, even though the full waveform is also available for the same operation.

In accordance with one aspect of the present invention, a determination of the robustness of the process algorithm is used to suggest that sign-bit representations of conventional recordings (i.e., where only the algebraic sign is retained) can be used in editing traces of large multichannel seismic systems.

That is to say, the present invention has been found to have surprising usefulness in providing cross-correlation estimates of sign-bit data in editing traces collected by large multichannel systems such as set forth in a copending application Ser. No. 429,358 "Method Of Editing Seismic Traces, As, Say Gathered By Large Multichannel Collection Systems", Raymond A. Ergas and assigned to the assignee of the present application. [In the above application, now Pat. No. 4,479,183 correlations estimates were used to determine if predetermined editing standards were met for each trace of the 500 or so traces collected each cycle of operation. If such standards were attained, full trace waveforms (of non-eliminated traces) were then used in subsequent processing operations even though the precursor testing was carried out over only a small time increment (say the last second of a six-second trace)].

BACKGROUND OF THE INVENTION

Martin et al., U.S. Pat. No. 4,058,791, for "Method And Apparatus For Processing Seismic Signals From Low Energy Sources", describes an effort to solve the growing problem of handling information collected in modern seismic surveying in which events of interest could be preserved if only the algebraic signs of the incoming signals (and not the full waveforms) were recorded. Using information channels that need to handle only sign-bits makes it possible to use several times as many channels for the same recording and processing capacity.

Also, Martin et al. observed that in some of their vibratory seismic work, that when sign-bit representations of the source waves were cross-correlated with sign-bit representations of the received waves, the resulting cross-correlation functions appear to be similar to cross-correlation functions from full-waveform inputs, provided that the resulting correlation functions are "common depth point stacked" to a high multiplicity ("the CDP fold is at least 40").

While Martin et al. recognized that high order stacked correlograms of sign-bit data (CDP folds of at least 40) may have acceptable processing qualities to allow their utilization in seismic interpretation, they did not anticipate the special circumstances that single-fold seismic data (or folds where n = 'for that matter) could be processed advantageously in a sign-bit form, or more importantly where, in a more general application to seismic processing, the "robust" property of the underlying sign-bit process could be ascertained.

On the general subject of robust modeling, see "Robust Modeling With Erratic Data", J. F. Claerbout and Francis Muir, *Geophysics*, Vol. 38, No. 5, pp. 826-844, 1973. In the paper, the question of the judicious use of robuts estimators vis-a-vis seismic data is raised but specific applications of such estimators are not discussed, especially in the area of spectral requirements for sign-clipped processing of such data.

SUMMARY OF THE INVENTION

In discovering special circumstances where the sign-clipped versions of full-waveform traces can be useful in seismic processes, systematic preprocessing of the seismic data of interest over a predetermined time window (or the equivalent) may be in order in some cases and is specifically related to the robustness of the process algorithms.

While robustness is typically determined by substituting different combinations of input data and observing the process results as the algorithm is repeated (the classical definition of the Monte Carlo method), the method of the present invention limits such testing to only those algorithms that involve cross-correlation estimates using seismic data in which distribution of the dependent variable of interest with respect to the independent variable (or series of variables) is non-Gaussian. Assuming a seismic trace in which the dependent variable is amplitude and the independent variable is frequency, a peak frequency shift must be of the order of at least 50% to meet these requirements. For shifts less than the above, the penalty extracted by the use of sign-clipped data is usually too great.

In other cases, sign-clipped versions of the seismic data can sometimes be used based on analogous application of the above standard so as to provide results that parallel those set forth above. E.g., in the copending application, op. cit., describing editing of seismic traces based on spectral estimates of the noise spectrum over a very short time window, standards are set forth to determine if the trace should be allowed to undergo further processing. In the circumstances set forth in the above application, sign-clipped versions of the data have been found to be useful in generating the required cross-correlation estimates.

The present invention hence contemplates a method for editing traces of large multichannel collection systems in partial sign-bit form through a pattern analysis of the associated noise spectrum that occurs only over a small time increment of each trace, say, the last second of the trace, and even though the full waveform is available for such operations.

Since other seismic processes of which I am aware also involve cross-correlation estimates of data having similar or analogous spectral characteristics, use of the present invention in such processes is also contemplated, e.g., cross-correlation estimates involving static corrections of certain seismic recordings come to mind.

DEFINITIONS

In this application, certain key terms are used in the description of the present invention and for ease of understanding several aspects of the invention, these terms are defined below.

The term "sign-bit data" refers to seismic traces in which only the algebraic sign of the signal is retained, as either a ONE or MINUS ONE.

The term "robustness" is used to indicate the degree of forgiveness, or tolerance characteristic, of a given process for satisfactory performance under unusual operating conditions. With specific reference to processing seismic data in sign-bit form, it refers to the degree that the algorithm of interest performs its task. Where the algorithm relates to editing traces based on certain noise spectral characteristics in partial sign-bit form, robustness is keyed to the fact that changes in the dependent variable, e.g., amplitude, as a function of the independent variable, i.e., frequency, are unrelated to the performance of the algorithm.

The term "color" pertains to the degree that the noise spectrum, by corollary, can be equated to the visible spectrum. E.g., true random noise measured over sufficiently long time periods will contain equal amounts of all frequencies, and by corollary with the visible spectrum is termed "white" (because a uniform amount of each frequency over the visible spectrum is seen as white light).

The term "skewed", as relating to the energy distribution of the noise spectrum, means that such distribution is also a function of the collection system and the associated environment where the seismic data is collected. If the latter have nonlinear response characteristics, then parameters can be imposed upon the collected data, causing the dominant "hue" of the noise spectrum to be shifted from "white" toward another "color". The degree that the system and the environment have imposed such nonlinear characteristics on the recorded traces (i.e., the degree of shift) can be related directly to the analogous dominant hue associated with the noise spectrum.

The term "time window" is defined as the time span of each trace over which the amplitudes thereof are examined or processed.

DESCRIPTION OF THE DRAWINGS

FIG. 1 is a flow chart for determining if seismic traces have favorable characteristics whereby sign-bit versions thereof can be used involving cross-correlation estimates;

FIG. 2 is another flow chart illustrating cross-correlation of sign-bit versions of the full waveforms of the traces of FIG. 1, in accordance with the present invention;

FIG. 3 is an illustrative side elevation of a large multichannel data acquisition system in which processing of the traces is enhanced by using sign-bit versions thereof in calculating selection estimates;

FIG. 4 is a schematic representation of typical traces provided by the large multichannel system of FIG. 3 illustrating acceptable and unacceptable noise characteristics thereof;

FIGS. 5A-5C are time and frequency representations of noise spectrums illustrating the variety of time and frequency characteristics of both actual and ideal traces: FIG. 5A being time and frequency characteristics having favorable characteristics in accordance with the steps of FIG. 1; and FIGS. 5B and 5C being time and frequency qualities of ideal traces, viz., "white" noise and ideal white seismic noise, respectively;

FIG. 6 is another flow diagram for editing traces of FIG. 5 involving generating correlation functions of sign-bit versions of the traces of FIG. 5;

FIG. 7 is a detail of steps involving the generation of correlation function estimates; and FIG. 8 is a schematic representation of the selection criteria for editing traces having noise characteristics of FIG. 5, as carried out by the flow diagrams of FIGS. 6 and 7.

DETAILED DESCRIPTION OF THE INVENTION

Referring to FIG. 1, there is illustrated in schematic form, a preprocessing method 10 for determining the robustness of a selected cross-correlation process.

While robustness is typically determined by solving overdetermined linear simultaneous equations (by squared error minimization) and then observing the minimization of absolute values of errors (see, *Fundamentals of Geophysical Data Processing*, J. F. Claerbout, McGraw-Hill, 1976, p. 123), the preprocessing method 10 of the present invention is limited first in scope to testing algorithms that generate cross-correlation estimates of seismic data and second, to steps of minimal mathematical complexity.

As shown in FIG. 1, a typical seismic trace is analyzed via a series of instructions 11-18 that control the operations of a digital computer such as an IBM Model 3033 to determine robustness of the cross-correlation algorithm under analysis. In this regard, the method 10 is set forth in sufficient detail to enable a computer programmer of ordinary skill in the seismic processing art to program a general purpose computer using a conventional programming language, such as FORTRAN, in accordance with the teachings of the present invention.

Briefly, the method 10 determines if a single condition of the algorithm can be met: that the dependent variable of interest varies in a non-Gaussian manner with respect to the independent variable (as depicted in instruction 12) over a representative interval.

After the method 10 determines that each trace meets the standard, the traces that do not meet the standard are flagged at instruction 14; a comparison instruction then assumes command at 15. All traces (and comparative results) are next stored at 16. That is to say, instruction 16 asumes control after the Gaussian distributional characteristics of all of the traces have been determined. These results are stored on tape 19. The method 10 termintes when instruction 17 is answered in the affirmative at 18. Alternative iteration of the instruction 17 is via loop 20.

[The fact that Gaussian probability functions are so frequently encountered in nature (not just in geophysics or in physics in general, but also in the biological and social sciences) is explained in detail in Claerbout, op. cit., in his classical discussion of the central-limit theorum of probability, Chapter 4, pp. 83 et seq.]

An interpretation of the results of the comparison instruction 15 (of flagged and unflagged traces on tape 19) next occurs; that comparison determining whether or not the particular cross-correlation process is (or is not) to be used in association with sign-bit versions of the data without payment of undue penalties.

FIG. 2 illustrates a cross-correlation process 30 in which a determination has been made—that sign-bit data could be used in the cross-correlation of traces 31 and 32, even though the full waveform is available for such processing.

As shown, not that process 30 involves sign clipping of the traces 31 and 32 at clipper 33 and 34 followed by cross-correlating the sign-clipped traces at cross-correlator 35. That is to say, the traces 31 and 32 (previously indicated to have a non-Gaussian dependent variable) are sign clipped at the clippers 33 and 34 whereby only the algebraic signs of their amplitudes are retained. At cross-correlator 35, estimates of the trace similarities of the sign-bit traces are generated. These estimates in turn are stored in buffer 36 after passing through editor 37 which converts the integer outputs of the cross-correlator 35 into floating point estimates.

Although traces 31 and 32 of FIG. 2 are seen to be somewhat similar in terms of amplitude vs. time variations, they are not identical. If the amplitude vs. time characteristics of such traces are identical, their processing via cross-correlator 35 is usually termed "auto-correlation". But for purposes of interpretation of this application, if traces 31 and 32 are identical, the term "cross-correlation" will be used to describe the latter type of processing inasmuch as autocorrelation is merely "cross-correlating" a trace with itself.

In a copending application, op. cit., there is described a method for editing traces of a large multichannel collection system based on cross-correlation estimates of the noise spectrum over a very short time window.

Note in the above-mentioned application that the noise spectral characteristic sought for verification involve a noise amplitude spectrum skewed toward the lower end of the frequency range, peaking at say 25 Hz., then decreasing therefrom in a smooth manner with increasing frequency up to about 200 Hz., that is to say, it is non-Gaussian. Hence, usage of sign-bit versions of such unstacked traces in the above cross-correlation process is contemplated. That is, since the peak frequency shift is greater than 50%, vis-a-vis, a Gaussian distribution of such spectrum (being in fact equal to a 75% peak shift), then cross-correlation estimates by definition involve a dependent variable, viz., amplitude, that varies in non-Gaussian function as a function of an independent variable, viz., frequency. Employing sign-bit data in such processing has been found to be especially rewarding in the environment of the above-identified application, viz., in the processing of data involving 500 or more channels of data collected each collection cycle.

Referring to collection of 500 or more traces in the above manner, reference should now be made to FIG. 3.

A large multichannel exploration system 50 is there shown. It includes a vessel 51. Vessel 51 tows a super multichannel seismic cable assembly 52. Seismic cable assembly 52 includes a shock-absorbing elastic section 56, a lead-in 57, and a short terminator section 58.

A typical seismic cable assembly 52 also consists of 50 or more active cable sections 60 (each of the latter being about 60 meters long). The assembly 52 may have a total length of 10,000 feet or more. Each cable section 60 may contain ten elemental sensors 61; a group of such sensors constitutes a single channel. A connector module 53, contained inside a transceiver unit connects active cable sections 60 together, electrically and mechanically. The entire cable assembly 52 produces output signals from about 500 individual channels, the resulting signal outputs from the sensors 61 and being coupled to the transceiver unit which transmits the signal to a central station 62 on vessel 51. The central station 62 includes control circuitry 64. In that way, interrogation, command, power, and test signals can be transmitted. Station 62 also includes a recording apparatus 66 to receive and record digital data words from the data link.

At intervals, a seismic sound source 59, such as an air gun or a gas exploder, generates acoustic waves in the water. The acoustic waves propagate downwardly along ray path 70 impinging upon water bottom 72 and become refracted along path 73 due to the velocity differences between the water and earth formation 74. Continuing along refracted ray path 73, the waves next become reflected from a subsurface earth layer 76. The reflected acoustic waves return along ray path 78 and thence continue upwardly along ray path 79 to be detected by a group of sensors which convert the reflected acoustic waves to electric signals. Acoustic waves which take other ray paths, such as 81-84, are detected by other sensors such as 61, in similar fashion. Result: 500 or so traces are recorded aboard the vessel each time source 59 is activated. Subsequent processing can yield multiple-fold CDP gathers, say where n is a range of 24 to 200 with n=50 being preferred.

FIG. 4 illustrates—in analog form—a series of traces that could be generated from the digital records at recorder 66 of FIG. 3 using conventional methods.

On the left side of the traces T1-T5 is a time scale. Time t=0 corresponds to a time value migratable to optimum surface level. Time t-tmax (say, equal to 6 seconds in actual practice) represents the maximum record time for receiving events from the earth. Amplitude excursions along the traces T1 and T2 indicate events occurring during the collection process, e.g., time at which the source 59 of FIG. 3 was activated (viz., between time t1 and t2); reflections from the horizon of strata 76 all indicated at time t and t+L.

Traces T1 and T2 are obviously symbolically suitable for further processing.

Traces T3, T4 and T5, however, represent sensor outputs that make such traces unsuitable for further enhancement. In this regard, trace T3 is a "dead" trace, having the output of an inoperative group of sensors 61 within an active cable section 60; traces T4 and T5 are outputs from groups of sensors 61 which have experienced extremely large system or environmental noise.

FIGS. 5A-5C illustrate different aspects of seismic noise and its relationship with the present invention.

In analyzing seismic signals that include system and/or environmental noise, certain conditions of time domain signal characteristics may be difficult to observe in that domain, but may be clearer in the frequency domain.

In FIG. 5A, the time domain and frequency domain characteristics of system and/or environmental noise associated with seismic traces having favorable editing qualities, are illustrated.

Note on the left side, the amplitude vs. time signature of an acceptable noise trace is seen. Its characteristics are rather difficult to analyze but on the right side, its amplitude vs. frequency characteristics are seen to set forth a smooth amplitude vs. frequency curve 80. That is, the curve rises smoothly from 0 Hz., peaks at about 25 Hz., and then decreases as a function of increasing frequency up to about 200 Hz. The pattern of curve 80 permits its description in alternative ways:

(i) by corollary with the visible spectrum, it can be described as "pink noise" since the wavelengths of the lower spectrum dominate;

(ii) because the peak of curve 80 has been skewed toward the lower frequencies, the distribution of the amplitude spectrum can be termed non-Gaussian since the curve 80 peaks at about 25 Hz., rather than at the mid-frequency of response, viz., at 100 Hz.

That is to say, a peak frequency shift of approximately 75% has occurred.

FIGS. 5B and 5C illustrate white noise characteristics in both the time and frequency domains in an "ideal" and in a known collection response state, respectively.

The term "white" as pertaining to the noise spectrum is used by way of analogy to the visible spectrum. That is to say, random noise measured over sufficiently long time periods will contain equal amounts of all frequencies.

Hence, amplitude vs. frequency curves 81 and 82 of FIGS. 5B and 5C are seen to be horizontal with respect to frequency. That is to say, the curve 81 of FIG. 5B is flat over all ranges of frequency in an "idealized" manner, but in FIG. 5C the curve 82 is only horizontal over a frequency range of about 0 to to 200 Hz. because the collection system is band-limiting. By corollary with the visible spectrum, such noise is termed "white" in both circumstances.

FIG. 6 illustrates in detail the large multichannel editing process in accordance with the present invention. It represents an overall viewpoint.

Assume that the editing process is carried out on-shore using, e.g., a conventional computing system in which pattern analysis of the noise spectrum occurs as a function of window length per individual trace, i.e., occurs on a trace-by-trace basis over only an incremental time window of the total trace record time. Conventional static and dynamic time corrections are of course omitted.

In FIG. 6, the flow chart sets forth the desired sequence of steps controlling the operation of the digital computer, such as an IBM Model 3033, to achieve the desired result of editing signals, viz., in order to provide seismic signals of greater intelligibility and clarity for geophysical analysis and interpretation. The flow chart sets forth the process steps of the present invention in sufficient detail to enable a computer programmer of ordinary skill in the seismic signal processing art to program a general purpose computer, using a conventional programming language such as FORTRAN, in accordance with the present invention.

An instruction 100 causes the computer system to read in the data record traces to be processed and the requisite input parameters to control the system. The input parameters include the following parameters:

N—defining the location of the time window;
M—the number of traces in the field data;
L—the length of the time window;
NB—the number of digital amplitude samples within the time window, equaling the input parameter L divided by the sample interval at which the digital amplitude samples are taken in the seismic data.

In practice, the minimum length of the window is 10 wavelengths of the mid-band of the noise spectrum; there is also a critical upper limit; if the window is too long, the process time savings can be lost; if too short, the value can be weighted by individual amplitudes rather than the noise spectrum as a whole. In practice, a one-second length window near the end of a conventional six-second trace has been found to be adequate.

The position of the window is determined by the fact that noise level must exceed that of the reflected signals. Hence, the last second of the trace is preferred, although the initial "mute zone" recording at long offsets can also be used.

After the trace has been scanned over the window i, instruction 110 assumes control and a series of noise spectrum functions, F0, F1 and F2 are generated in sequential order.

Initially, a power level F0 is determined for each trace of the record by squaring the amplitude samples in each trace segment over the common time window i. Each power level F0 is so determined that it can be later compared with a specified power level (as explained below) and those which do not exceed the value are then set to eliminated. In effect, such processing prevents low amplitude level signals of little interest from unduly affecting analysis, such as by causing statistical degradation desirable seismic signals of intermediate amplitude due to their prominence in comparison with these low amplitude level signals; or, such processing excludes traces in which the noise tends to be exceedingly high.

Next, the first and second spectral estimates F1 and F2 of the noise spectrum of each trace are generated using sign-bit versions of the traces in the manner set forth in FIG. 7.

As shown in FIG. 7, instructions 130 and 140, respectively, assume command and cause the computation of the first and second spectral estimates of the traces, preferably by cross-correlating sign-bit versions of each trace segment with itself, using a multiple time operator. That operator is preferably set at time shifts (or lags) of one and two sample points centered at the time window T1-T2. That is to say, processing in accordance with the present invention involves the determination of first and second spectral estimates of the normalized cross-correlation functions of the clipped trace i over the time window T1-T2 at time shafts or lags of $\tau = 1$ sample and $\tau = 2$ sample shifts. Since the delay operator only shifts the waveform one and two sample points, respectively, the process is exceedingly rapid since only the algebraic sign of the amplitudes of each trace segment is used.

That is, in determining the estimates F1 and F2, the computer cross-correlates the sign-clipped waveform with itself over the window T1-T2; that is to say, cross-productizes the sums of the sign-clipped amplitude samples of the recording at (i) zero time shift (centered of course at the window i); and (ii) at time shifts = 1 and = 2 sample in serium divided by the square of the amplitude samples at zero lag, to produce the normalized function F1 and F2 of the clipped traces; see, R. E. Sheriff, "Encyclopedia of Exploration Geophysics", SEG, Tulsa, Okla., page 15.

Returning to FIG. 6, it should be noted that determining the spectral function F0 by calculating the power level of the particular trace segment is equivalent to generating the zero lag cross-correlation function of the same waveform in non-normalized fashion. That is to say, the function F0 can also be determined by correlating the waveform segment itself over the time window T1-T2 via cross-productizing the sums of the zero time shift amplitudes with themselves, and then ignoring the subsequent normalizing step related to dividing the generated numerator by the square of the amplitude samples. But it must be achieved before the traces are sign clipped for determining F1 and F2 estimates.

Instruction 120 next assumes control and the limits of each calculated function F0, F1 and F2 are compared with specified minimum values for standard traces over a standard window based on an acceptable minimum level for desired subsequent signal processing, as explained below. If the calculated values of F0, F1 or F2 do not meet the standards, the trace is flagged via instruction 150 in loop 160. The computer also logs the number of the trace flagged by the instruction 120.

Instruction 170 next assumes control and stores the unflagged traces, say by loading such data onto tape 180. The process terminates when instruction 190 is answered in the affirmative, alternative iteration occurring via loop 200.

Removing the flagged traces from further processing removes data of little interest and thereby prevents confusion of valid data with invalid and important information. That is to say, the cross-correlation functions F1, F2 and F3 after being compared with default values which define acceptable skewness patterns of the noise spectrum, i.e., qualities that indicate such traces are worth further enhancement.

FIG. 8 is illustrative of the selection criteria of the present invention in more detail.

Selection is based on establishing classification functions for each trace in the manner previously described. That is to say, two groups of traces (e.g., acceptable trace 210 and unacceptable trace 211) are established by the classification process of the present invention.

It should also be noted that in the preferred application of the method of the present invention, the basis of selection is akin to projecting each individual nonlinear function F0, F1 or F2 onto the x, y, z plot of FIG. 8, i.e., relative to axes 215, 216 and 217, and then determining if such functions fall—as a class—within (or without) standard limits of interest. While the latter of course are projectable as a parallelopipod 218 in FIG. 8, in actual fact, such limits are prestored by default values. Comparison is hence on a field-by-field basis in pairs of such values.

A program for carrying out the method of the present invention has been designed and is characterized by use of FORTRAN editing statements wherein array limits for the functions F0, F1 and F2 are as set forth below.

"EDPARM—Three pairs of data limits for editing traces; each trace having properties outside of these bounds will be excluded from processing. The first pair define the limits of the power of the traces (0-Lag autocorrelation). The second pair of values define the limits of the estimated 1-lag normalized autocorrelation using sign-clipped traces. The third pair of values define the limits of the estimated 2-lag normalized autocorrelation also employing sign-clipped traces."

Default values for the program are set forth in Table I and were empirically designed.

TABLE I

| Variable | Limits |
| --- | --- |
| F0 | .025–.050 |
| F1 | .200–1.01 |
| F2 | .050–1.01 |

The above-identified default values are based in part on discriminant analysis involving testing of several thousand actual field traces. As a consequence of such analysis, the traces were classified into either acceptable or unacceptable categories using a series of scatter plots in which the above limits were produced in conventional fashion.

Traces from the Gulf region of the United States can be edited with satisfactory results using default values in the ranges set forth above. But traces from other regions and/or involving other recording situations may require a slight deviation from the above limits. But in such cases, experience has also shown that while the range of limits associated with the spectral estimates F1 and F2 involving sign-clipped data usually does not require adjustment, in the case of the limits associated with the estimate of the non-normalized cross-correlation function at zero lag, i.e., the function F0, this is not the case.

Since in the latter circumstance, the power level can vary as a function of environmental and system gathering factors, such as water depth, gain setting and other well-documented parameters, limits may have to be adjusted out the range of default values set forth above. Scatter plots again are helpful in this regard, viz., in re-establishing default values within acceptable processing standards.

The invention is not limited to the above combinations along, but is applicable to other anomalous circumstances as known to those skilled in the art. It should thus be understood that the invention is not limited to any specific embodiments set forth herein, as variations are readily apparent.

E.g., while on-shore processing is now preferred (because of machine availability) and hence represents the best mode for carrying out the present invention, it is contemplated that at-sea processing would be carried out using a microcomputer system such as described in U.S. Pat. No. 4,316,267, for "Method For Interpreting Events Of Seismic Records To Yield Indications Of Gaseous Hydrocarbons", W. J. Ostrander, issued on Feb. 16, 1982 and assigned to the assignee of the present application. It may in such cases be necessary to change the window increment and to adjust line position along the time scale in order that the scanned data contain sufficient noise. Since the S/N ratio characteristics of earlier parts of each trace may also be below unity, such parts could be used, although the last second of the six-second conventional trace is currently preferred, as previously mentioned. Thus, the invention is to be given the broadest possible interpretation within the terms of the following claims.

What is claimed is:

1. A robust method of examining field traces T0, T1, T2 . . . T associated with a collection survey providing N fold subsurface common depth point coverage of an earth formation, to determine if sign-clipped versions of said traces T0 . . . T can be used in generating cross-correlation estimates in subsequent seismic processing irrespective of the fact that full-waveform versions of said traces T0 . . . T are available for such processing:

(i) determining a time window i for examining each trace T0 . . . T, said window defining a trace segment thereof containing a plurality of sample points associated with a dependent variable that varies as a function of one or more independent variables;

(ii) determining skewness of said dependent variable of said trace T0 . . . T as a function of said one or more independent variables, over said time window i one trace-at-a-time;

(iii) comparing said determined skewness of step (ii) with a Gaussian distribution of said same variable as a function of said same one or more independent variables; and (iv) if said skewness of step (iii) deviates substantially from that of said Gaussian distribution, sign clipping said trace T0 . . . T over at least said window i wherein a resulting sign-clipped version can be used in generating cross-correlation estimates in a subsequent seismic processing method within undue loss in accuracy, said substantial deviation of said skewness of step (ii) from that of said Gaussian distribution being such as to define a shift in magnitude of the peak independent variable of at least 50% from that associated with said Gaussian distribution.

2. The method of claim 1 in which steps (i)–(iii) are carried out using an unstacked trace segment.

3. The method of claim 1 in which said standard Gaussian distribution of step (iii) used for comparison with that generated in step (ii) over said time window i, defines amplitude spectral characteristics as a function of frequency, and in which said substantial deviation of skewness in accordance with step (iii) being such as to define a shift of peak seismic frequency at least 50% normalized to that associated with said Gaussian distribution.

4. The method of claim 3 in which said generated skewness of step (ii) defines an amplitude vs. frequency spectrum that peaks at lower seismic frequencies and is termed "pink" as a corollary to the visible spectrum.

5. A robust method of editing field traces T0, T1, T2 ... T associated with a large multichannel seismic collection survey collecting M channels of data per collection cycle so as to provide N fold subsurface common depth point coverage of an earth formation using part sign-clipped versions of said traces T0 ... T without need of either full trace examination along the full-time scale of said trace, or without examination of adjacent traces associated with each trace T0 ... T, comprising:

(i) determining a time window for examining each trace T0 ... T, said window defining a full-wave trace segment thereof containing a plurality of sample points defining a signal-to-noise ratio below unity and being associated with a dependent variable that varies as a function of one or more independent variables;

(ii) sign clipping said independent variable associated with said full-wave trace segment over said time window i thereby forming a sign-clipped version thereof;

(iii) generating a series of statistical functions including cross-correlation estimates F1 ... F associated with said sign-clipped independent variable of step (ii) over said time window i for said trace T0 ... T;

(iv) comparing said generated statistical functions of step (iii) with a series of similar values associated with a standard trace which experience indicates if the limits thereof are exceeded, is unacceptable for further processing; and (v) if said generated limits of step (iv) exceed said standard limits of said standard trace, removing said trace from further seismic processing, said removal occurring without the need of examining other time segments of said trace and without examining adjacent traces associated with said trace T0 ... T.

6. The method of claim 5 in which steps (i)–(iv) are carried out using unstacked trace segments.

7. The method of claim 5 in which M is about 500, and N is about 50.

8. The method of claim 5 in which said values of step (iv) for comparison with values generated in step (iii) over said time window i define noise spectral characteristics in which distribution of amplitude as a function of seismic frequencies is non-Gaussian.

9. The method of claim 8 in which said values of step (iv) for comparison with said generated values of step (iii) defines an amplitude spectrum skewed toward lower frequencies so as to define "pink noise" as corollary to the visible spectrum.

10. The method of claim 5 in which said step of generating a series of statistical functions involve the substeps of calculating the power level of each trace over the time window, using a full-waveform version of said trace segment, and determining the normalized cross-correlation functions F1 ... F at different values of a time delay operator controlling the amount of time delay between said original sign-clipped segment and a delayed sign-clipped waveform of the same segment as the cross-productized sums of that correlation are formed.

11. The method of claim 10 in which the substep related to determining the normalized cross-correlation functions F1 ... F are further characterized by generating a first delayed sign-clipped waveform of the normalized cross-correlation function F1 via delaying that waveform one sample point, measured at the center of the time window before the cross-productized sums of that sign-clipped waveform and said original sign-clipped waveform are generated, as well as by producing a second delayed sign-clipped waveform of the normalized cross-correlation function F2 by delaying that sign-clipped waveform two sample points, measured at the center of the time window before the cross-productized sums of that correlation are formed.

* * * * *